June 14, 1932.  E. F. ROSSMAN  1,863,315
SHOCK ABSORBER
Filed July 30, 1930

Inventor
EDWIN F. ROSSMAN

By Spencer, Hardman and Fehr
Attorneys

Patented June 14, 1932

1,863,315

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

SHOCK ABSORBER

Application filed July 30, 1930. Serial No. 471,680.

This invention relates to improvements in double-acting hydraulic shock absorbers.

It is among the objects of the present invention to provide a hydraulic shock absorber, adapted to control both the compression and rebound movements of a vehicle spring, with fluid flow controlling devices which control the flow of fluid from one end of the shock absorber to the other as it is operated by the movements of the vehicle axle.

Another object of the present invention is to provide a fluid flow controlling device for a shock absorber which is designed first to open wide under low pressures to permit an unrestricted flow, then at gradually increasing pressures will be closed gradually to provide a predetermined restriction to the flow of fluid.

Further objects and advantages of the present invention will be apparent from the following description, reference being had to the accompanying drawing wherein a preferred embodiment of one form of the present invention is clearly shown.

Figure 1:
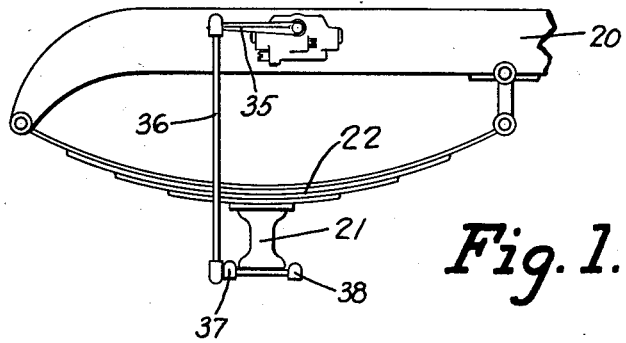
Fig. 1 is a fragmentary side view of a vehicle chassis, having a shock absorber embodying the present invention applied thereto.

Referring to the drawing, the numeral 20 designates the frame of the vehicle supported upon the vehicle axle 21 by springs 22, only one of which is shown in the Fig. 1.

The shock absorber comprises a casing 23 providing a fluid reservoir 24 and a cylinder 25 in communication with said reservoir. The two open ends of the cylinder are closed and sealed by cylinder heads 26 and 27 each of which has a gasket 28.

A piston 29 is reciprocably supported within the cylinder, said piston having its piston head portions 30 and 31 tied together by a web portion 32. A space between the piston head portions 30 and 31 receives the rocker lever 33 which is provided on the rocker shaft 34. One end of the rocker shaft 34 extends outside of the casing 23 and has the shock absorber operating arm 35 provided thereon. The free end of arm 35 is swivelly connected to one end of the connecting link 36, the other end of which is swivelly attached to a bracket 37 anchored to the axle 21 by the clamping member 38.

The head portion 30 of the piston 29 forms the spring compression control chamber 40 at the end of the cylinder closed by cylinder head 26, while piston head portion 31 forms the spring rebound control chamber 41 at the end of the cylinder closed by the cylinder head 27.

In the casing two valve chambers 45 and 46 are provided, the valve chamber 45 being in communication with the spring compression control chamber through the duct 47. Valve chamber 46 is in communication with the spring rebound control chamber through the duct 48. Valve chamber 45 is in communication with duct 48 through the passage 49, while a similar passage 50 connects duct 47 with valve chamber 46.

Each valve chamber 45 and 46 is provided with a suitable fluid flow control device which controls the flow of fluid from one control chamber into the other for purposes of providing restriction whereby the movement of the shock absorber is resisted and consequently the action of the springs is resisted in a like manner. Inasmuch as both of these fluid flow controlling devices are substantially alike, only the one in valve chamber 45 will detailedly be described.

Figure 2:
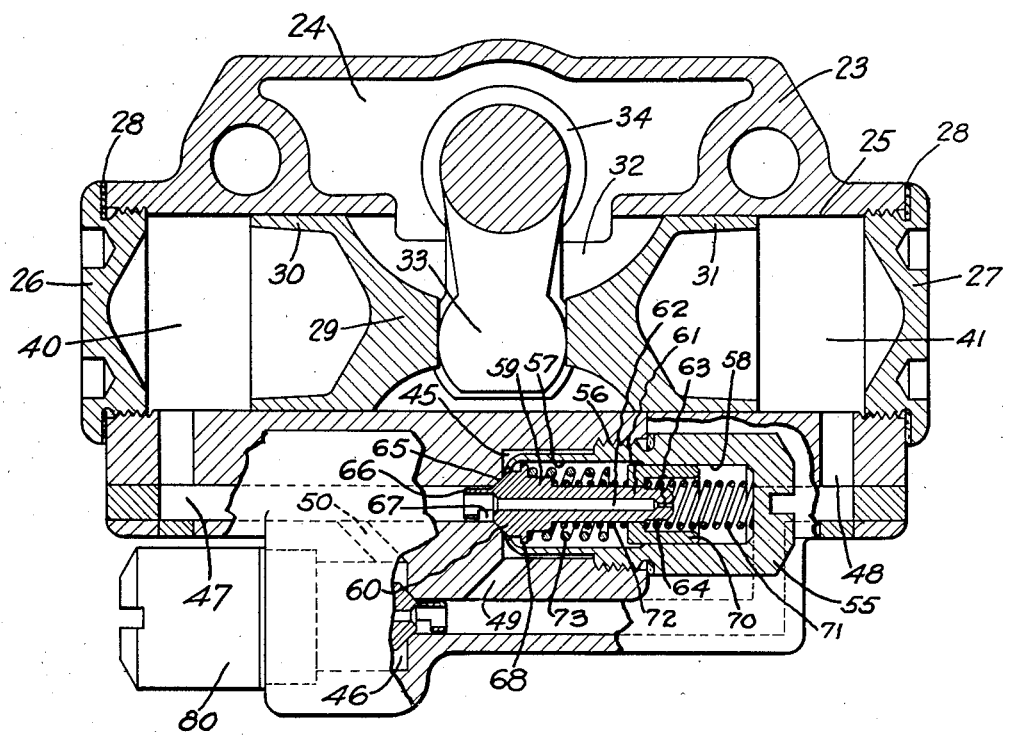
Fig. 2 is a longitudinal sectional view taken through the shock absorber.

The fluid flow controlling device comprises a housing 55 having a screw-threaded portion 56 by which the housing is secured in the valve chamber as shown. A recess in the housing 55 provides two cylinder portions 57 and 58, the former being of greater diameter than the latter. A valve 59 is provided within the housing 55, said valve comprising a head portion 60 and a stem portion 61. A longitudinal passage 62 passes through the entire length of the valve, said passage being reduced at the end opposite the head portion 60 as at 63 to provide a fluid flow orifice. A portion of the stem at this same end is of lesser outside diameter as at 64 than the remaining portion of the stem, for purposes to be described. The head 60 of the valve has a tapering surface as at 65 which engages the annular edge or valve seat formed at the mouth of the duct 47 as it meets the valve chamber 45. A cylindrical projection 66, of lesser outside diameter than the inner diameter of the duct 47, forms a pilot on the valve head 60 which normally enters into the duct 47 as shown in Fig. 2. This cylindrical projection 66 has a side opening 67 normally inside the duct 47. A flange 68 on the valve head engages an inwardly extending annular flange on the end of the housing 55 whereby removal of the valve from the housing is substantially prevented. When valve head 60 engages the valve-seat 65, a span is provided between the valve-head 60 and the inwardly extending flange on the housing portion defining the cylindrical portion 57 so that fluid in said portion 57 may escape into the valve chamber 45 and from there through the passage 49.

A recessed plunger or piston 70 is slidably supported within the smaller diameter cylinder portion 58 of the housing 55, the head of the plunger 70 having an opening therein in which the valve stem 61 is slidably supported. A spring 71 is interposed between plunger 70 and the closed end of the housing 55. A similar spring 72 surrounds the stem 61 and is interposed between the flange 68 on the valve head 60 and the plunger 70. These springs 71 and 72 coact normally to maintain the plunger 70 in proper position within the smaller diameter cylinder portion 58 as shown in Fig. 2. When the plunger is in this position the reduced end 64 of the stem 61 is inside the recess of the plunger 70, or more particularly on the side of the plunger 70 opposite the valve head 60. A second spring 73 is interposed between the valve head 60 to which one end of said spring is attached and the plunger 70, this spring 73 being of substantially greater tension than either of the springs 71 or 72 and being of lesser length than the normal distance between the flange 68 of the valve head 60 and the plunger 70.

The device operates in the following manner:

When the road wheels (not shown in the drawing) strike an obstruction in the roadway, the springs 22 will be flexed and compressed, thereby moving toward the frame 20 and causing the link connection 36 to operate the shock absorber arm 35 in a clockwise manner so that the rocker arm 33 moves the piston 29 toward the left as regards Fig. 2. In this instance fluid within the spring compression control chamber 40 will have pressure exerted thereupon, forcing said fluid from said chamber 40 through the duct 47 against the valve 59. This initial pressure will force the valve head 60 from its seat, against the effect of spring 72, the movement being limited by the engagement of the end of the spring 73 with the plunger 70. Now fluid may flow through the enlarged portion of passage 62 in the valve, side opening 67 into the valve chamber 45, thence through the passage 49 into the duct 48 which discharges into the spring rebound control chamber 41.

Another flow of fluid through the longitudinal passage 62 of the valve and through the orifice 63 discharges into the chamber in the cylinder portion 58, between the plunger 70 and the closed end of the housing 55, building up a pressure in this chamber which, when sufficient, will urge the plunger 70 toward the valve head 60. At a predetermined degree of pressure within the cylinder portion 58, plunger 70 will urge the valve 59 toward its seat and thereby restrict the flow of fluid around said valve, as has been described. Increasing pressure in the cylinder portion 58 will increase the movement of the valve head 60 toward its seat and thereby increase the restriction to the flow of fluid around it and, when the plunger 70 has compressed spring 73 sufficiently, it will move out of the smaller diameter cylinder portion 58 into the larger diameter cylinder portion 57 and thereby will be established a restricted flow of fluid around the plunger into the cylinder portion 57 which will discharge around the valve head 60 into the passage 49 as stated heretofore. This restriction to the flow of fluid from chamber 40 to chamber 41 resists the movement of the piston 29 toward the left and thereby the compression movement of springs 22 will likewise be resisted.

After having been flexed or compressed to the limit in accordance with the particular obstruction being met in the roadway, the springs will return to normal load position, thus reversing the movement of the shock absorber so that the piston 29 moves toward the right as regards Fig. 2. Now the fluid in the chamber 41 will be pushed through the duct 48 toward the duct 47 to chamber 40, the fluid passage through these ducts being controlled by the fluid pressure controlling valve 80 which, as has been mentioned before, is substantially like the fluid flow controlling device aforedescribed.

A part of the initial fluid pressure in duct 48 is exerted through the passage 49 into the valve chamber 45 and will be directed against the plunger 70 to move said plunger into the cylinder portion 58 against the effect of spring 71 so that eventually the opening in the head of piston or plunger 70 will slide off the main portion of stem 61 and will align with the reduced end portion 64 of the valve stem 61 to establish a fluid leak through the space between the plunger 70 and the valve stem portion 64 into the cylinder portion 58 and thence through the orifice 63, longitudinal passage 62 into the duct 47 which discharges into chamber 40. This same operation occurs when the piston 29 moves toward the left, a part of the fluid initially discharging from the duct 47 through passage 50 into the valve chamber 46 and being controlled by the plunger and the reduced end of the valve stem of the fluid flow controlling device 80.

From the aforegoing it may be seen that applicant has provided a double-acting shock absorber, equipped with fluid flow controlling valves of the delayed-closing type, said valves opening wide initially and under low pressure, then at increasing fluid pressure gradually closing to establish more restricted flows whereby the action of the shock absorber is gradually controlled so as to increase resistance to the action of the springs.

While the form of embodiment of the present invention as herein disclosed, constitutes a preferred form, it is to be understood that other forms might be adopted, all coming within the scope of the claims which follow.

What is claimed is as follows:

1. A relief device for a chamber containing a fluid which is subject to variations in pressure, comprising, a housing; a valve in said housing; a piston in said housing; springs yieldably maintaining the valve and piston in proper normal position relative to each other and to the housing, a spring of comparatively greater tension than the other springs mentioned, interposed between the valve and piston, said spring being shorter than the normal distance between the valve and piston.

2. A relief device for a chamber containing a fluid which is subject to variations in pressure, comprising, a housing; a valve in said housing; a piston in said housing; springs yieldably maintaining the valve in normal, closing position and the piston in proper position relative to the valve and to the housing; and a spring between the valve and piston, of shorter length than the normal distance between the valve and piston.

3. A relief device for a chamber containing a fluid which is subject to variations in pressure comprising, a housing providing a cylinder; a piston in said cylinder; a valve; springs engaging the piston and valve and yieldably maintaining them in normal position relative to each other and relative to the housing; and a spring of comparatively greater tension than the aforementioned springs, one end which is secured to the valve, the other end being spaced from the piston.

4. A relief device for a chamber containing a fluid which is subject to variations in pressure comprising, a housing providing a cylinder; a piston slidably supported in the cylinder, forming a fluid chamber therein; a valve in the housing, comprising a head portion and a stem portion, the latter portion being slidably supported by the piston, said valve having a longitudinal passage communicating with the fluid chamber in the cylinder, springs engaging the piston and valve, yieldably maintaining them in proper position relative to each other and relative to the housing; a spring interposed between the piston and valve-head, said spring being shorter than the normal distance between the piston and valve-head.

5. A relief device for a chamber containing a fluid which is subject to variations in pressure, comprising, a housing providing a cylinder of different interior diameters, the smaller end of which is closed; a piston slidably supported in the smaller diameter cylinder, forming a fluid pressure chamber at the smaller end of the housing and a valve chamber at the other end thereof; a tubular valve in the valve chamber, comprising a head portion and a stem portion slidably supported in the piston; springs interposed between the valve head and piston and the piston and closed end of the housing; and a second spring interposed between the valve-head and piston, shorter than the normal distance between them and of greater tension than the other spring therebetween.

6. A relief device for a chamber containing a fluid which is subject to variations in pressure, comprising, a housing providing a cylinder of different interior diameters, the smaller end of which is closed; a piston slidably supported in the smaller diameter cylinder, forming a fluid pressure chamber at the smaller end of the housing and a valve chamber at the other end thereof; a valve in the valve chamber, comprising a head portion and a stem portion, the latter being slidably carried in the piston, said valve having a longitudinal passage reduced adjacent the end of the stem portion so as to provide an orifice which is in communication with the fluid pressure chamber, a spring interposed between the piston and closed end of the housing yieldably urging the piston toward the valve-head; another spring interposed between the piston and valve-head, yieldably urging the valve into normal closing position and counter balancing the first mentioned spring to maintain the piston in proper position in the cylinder; and a second spring interposed between the valve and piston, of greater tension than the other spring therebetween and shorter than the normal distance between the valve-head and piston.

7. A relief device for a chamber containing a fluid which is subject to variations in pressure, comprising, a housing providing a cylinder of different interior diameters, the smaller end of which is closed; a piston slidably supported in the smaller diameter cylinder, forming a fluid pressure chamber at the smaller end of the housing and a valve chamber at the other end thereof; a tubular valve having a head-portion and a stem portion, the latter being slidably carried by the piston and extending into the fluid pressure chamber, the portion of said stem extending into said chamber being of lesser diameter than the other portion of the stem including that part directly engaging the piston; springs engaging the piston and valve-head portion yieldably to maintain them in proper normal position relative to each other and to the housing; and a spring between the valve-head and piston, shorter than the normal distance between them.

8. A double acting hydraulic shock absorber comprising, a fluid containing cylinder having a relief port communicating with each end thereof; a piston reciprocable in said cylinder forming a compression chamber at each end thereof; a fluid flow controlling device for each cylinder port each device comprising a housing containing a tubular valve for the port; a spring yieldably urging the valve into port closing position when the piston is in neutral position and adapted to yield in response to inital compressive movement of said piston to establish a flow of fluid around said valve into the port of the other fluid flow controlling device and through said valve into its respective housing; and a plunger slidably supported in the housing and fitting about the tubular valve, operated in one direction by a certain fluid pressure through said valve to urge said valve toward the port to reduce the flow of fluid around said valve, and to establish a passage for the escape of fluid flow through said valve; said plunger being moved in the other direction and out of engagement with its respective valve in response to fluid pressure in the port of the other cylinder end to establish a flow of fluid from said port around and through its respective tubular valve and into the port of its respective fluid flow controlling device.

9. A double-acting, hydraulic shock absorber comprising, in combination, a casing having a cylinder; a piston in said cylinder forming two compression chambers therein; two valve chambers in said casing; a duct leading from each compression chamber to a respective valve chamber, each valve chamber being in communication with the duct of the other valve chamber by a passage in the casing; and a fluid flow control device in each valve chamber, normally cutting off communication between the respective valve chamber and its duct, each device being capable of establishing restricted flows of fluid from its duct into its respective chamber in response to fluid pressure in its duct and also to establish a restricted flow from the duct of the other fluid flow control device into its own duct in response to fluid pressure in said other duct.

In testimony whereof I hereto affix my signature.

EDWIN F. ROSSMAN,